US012627627B2

(12) United States Patent
Voss

(10) Patent No.: US 12,627,627 B2
(45) Date of Patent: *May 12, 2026

(54) MESSAGE COMPOSITION INTERFACE

(71) Applicant: Snap Inc., Santa Monica, CA (US)

(72) Inventor: Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,026

(22) Filed: Sep. 20, 2022

(65) Prior Publication Data

US 2023/0018205 A1      Jan. 19, 2023

Related U.S. Application Data

(63) Continuation of application No. 16/232,803, filed on Dec. 26, 2018, now Pat. No. 11,516,173.

(51) Int. Cl.
H04L 51/52           (2022.01)
H04L 51/04           (2022.01)

(52) U.S. Cl.
CPC .............. H04L 51/52 (2022.05); H04L 51/04 (2013.01)

(58) Field of Classification Search
CPC ................................ H04L 51/52; H04L 51/04
USPC ......................................................... 709/206
See application file for complete search history.

(56) References Cited

U.S. PATENT DOCUMENTS

| | | | |
|---|---|---|---|
| 5,880,731 A | 3/1999 | Liles et al. | |
| 6,023,270 A | 2/2000 | Brush, II et al. | |

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |

(Continued)

FOREIGN PATENT DOCUMENTS

| | | | |
|---|---|---|---|
| CN | 109863532 A | 6/2019 | |
| CN | 110168478 A | 8/2019 | |

(Continued)

OTHER PUBLICATIONS

"U.S. Appl. No. 16/232,803, Final Office Action mailed Feb. 24, 2022", 33 pgs.

(Continued)

*Primary Examiner* — Lan Dai T Truong

(74) *Attorney, Agent, or Firm* — Schwegman Lundberg & Woessner, P.A.

(57) ABSTRACT

A message composition system to generate and distribute a plurality of messages to individual recipients based on a single message request, wherein each message among the plurality of messages is addressed and sent to a distinct recipient. According to certain embodiments, the message composition system is configured to perform operations that include, receiving a request to generate a message at a client device, causing display of a composition interface in response to the request to generate the message, wherein the composition interface includes a presentation of a menu that includes a list of user contacts, receiving an identification of a plurality of user contacts from among the list of user contacts, and generating a set of messages in response to the identification of the plurality of user contacts, wherein the set of messages are each individually addressed to the users among the plurality of user contacts.

12 Claims, 9 Drawing Sheets

(56) References Cited

U.S. PATENT DOCUMENTS

| | | | |
|---|---|---|---|
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol, II |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres Del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,694,589 B2 | 4/2014 | Buchheit et al. |
| 8,809,309 B2 | 8/2014 | Yan et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel |
| 9,460,541 B2 | 10/2016 | Li et al. |
| 9,489,760 B2 | 11/2016 | Li et al. |
| 9,503,845 B2 | 11/2016 | Watanabe |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,666,587 B2 | 5/2020 | Adler et al. |
| 10,680,986 B1 | 6/2020 | Wu |
| 10,891,723 B1 | 1/2021 | Chung et al. |
| 11,516,173 B1 | 11/2022 | Voss |
| 2002/0067362 A1 | 6/2002 | Agostino et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0331418 A1 | 12/2012 | Bonforte |
| 2013/0103760 A1 | 4/2013 | Golding |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2015/0271653 A1 | 9/2015 | Brooks et al. |
| 2016/0099901 A1 | 4/2016 | Allen et al. |
| 2016/0134840 A1 | 5/2016 | Mcculloch |
| 2016/0165032 A1* | 6/2016 | Chang ................... H04L 67/142 |
| | | 455/566 |
| 2016/0234149 A1 | 8/2016 | Tsuda et al. |
| 2016/0239165 A1* | 8/2016 | Chen ...................... H04L 51/42 |
| 2016/0299900 A1* | 10/2016 | Tseng ................. G06F 16/9536 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |

(56) References Cited

U.S. PATENT DOCUMENTS

| | | |
|---|---|---|
| 2017/0199855 A1 | 7/2017 | Fishbeck et al. |
| 2017/0235848 A1 | 8/2017 | Van Dusen et al. |
| 2017/0244652 A1 | 8/2017 | Clarke |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0113913 A1* | 4/2018 | Lee ........................ H04L 51/216 |
| 2018/0115503 A1 | 4/2018 | Baldwin et al. |
| 2018/0174085 A1 | 6/2018 | McCoy et al. |
| 2018/0295092 A1* | 10/2018 | Peiris ..................... G06Q 50/01 |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0367489 A1 | 12/2018 | Dye et al. |
| 2019/0001223 A1 | 1/2019 | Blackstock et al. |
| 2019/0057616 A1 | 2/2019 | Cohen et al. |
| 2019/0114021 A1* | 4/2019 | Oliver ..................... G06F 3/017 |
| 2019/0188920 A1 | 6/2019 | Mcphee et al. |
| 2019/0212889 A1* | 7/2019 | Liu ........................ G06F 3/0486 |
| 2019/0334847 A1* | 10/2019 | Genovese ............. G06F 3/0482 |
| 2021/0264045 A1* | 8/2021 | Birkel .................... G06Q 10/10 |
| 2022/0021941 A1* | 1/2022 | Mitchard ............ G06F 3/04883 |
| 2022/0377034 A1* | 11/2022 | Fried ........................ H04L 67/55 |
| 2023/0344878 A1* | 10/2023 | Cozzi .................. H04L 65/1069 |

FOREIGN PATENT DOCUMENTS

| | | | |
|---|---|---|---|
| EP | 2184092 A2 | 5/2010 | |
| JP | 2001230801 A | 8/2001 | |
| JP | 5497931 B2 | 3/2014 | |
| KR | 10144526381 | 9/2014 | |
| WO | WO-2003094072 A1 | 11/2003 | |
| WO | WO-2004095308 A1 | 11/2004 | |
| WO | WO-2006107182 A1 | 10/2006 | |
| WO | WO-2007134402 A1 | 11/2007 | |
| WO | WO-2012139276 A1 | 10/2012 | |
| WO | WO-2013027893 A1 | 2/2013 | |
| WO | WO-2013152454 A1 | 10/2013 | |
| WO | WO-2013166588 A1 | 11/2013 | |
| WO | WO-2014031899 A1 | 2/2014 | |
| WO | WO-2014194439 A1 | 12/2014 | |
| WO | WO-2016090605 A1 | 6/2016 | |
| WO | WO-2018081013 A1 | 5/2018 | |
| WO | WO-2018102562 A1 | 6/2018 | |
| WO | WO-2018129531 A1 | 7/2018 | |
| WO | WO-2019089613 A1 | 5/2019 | |

OTHER PUBLICATIONS

"U.S. Appl. No. 16/232,803, Final Office Action mailed Jul. 6, 2021", 29 pgs.

"U.S. Appl. No. 16/232,803, Final Office Action malled Nov. 4, 2020", 26 pgs.

"U.S. Appl. No. 16/232,803, Non Final Office Action mailed Mar. 3, 2021", 28 pgs.

"U.S. Appl. No. 16/232,803, Non Final Office Action mailed Jun. 8, 2022", 6 pgs.

"U.S. Appl. No. 16/232,803, Non Final Office Action mailed Jun. 25, 2020", 22 pgs.

"U.S. Appl. No. 16/232,803, Non Final Office Action mailed Sep. 21, 2021", 29 pgs.

"U.S. Appl. No. 16/232,803, Notice of Allowance mailed Jul. 25, 2022", 8 pgs.

"U.S. Appl. No. 16/232,803, Response filed Jan. 19, 2022 to Non Final Office Action mailed Sep. 21, 2021", 12 pgs.

"U.S. Appl. No. 16/232,803, Response filed Feb. 4, 2021 to Final Office Action mailed Nov. 4, 2020", 11 pgs.

"U.S. Appl. No. 16/232,803, Response filed Mar. 30, 2021 to Non Final Office Action mailed Mar. 3, 2021", 10 pgs.

"U.S. Appl. No. 16/232,803, Response filed May 23, 2022 to Final Office Action mailed Feb. 24, 2022", 11 pgs.

"U.S. Appl. No. 16/232,803, Response filed Jul. 8, 2022 to Non Final Office Action mailed Jun. 8, 2022", 9 pgs.

"U.S. Appl. No. 16/232,803, Response filed Sep. 1, 2020 to Non Final Office Action mailed Jun. 25, 2020", 11 pgs.

"U.S. Appl. No. 16/232,803, Response filed Sep. 7, 2021 to Final Office Action mailed Jul. 6, 2021", 12 pages.

* cited by examiner

MESSAGING CLIENT APPLICATION
104

EPHEMERAL TIMER
SYSTEM 202

COLLECTION
MANAGEMENT
SYSTEM 204

CURATION
INTERFACE 208

ANNOTATION
SYSTEM 206

APPLICATION SERVER
112

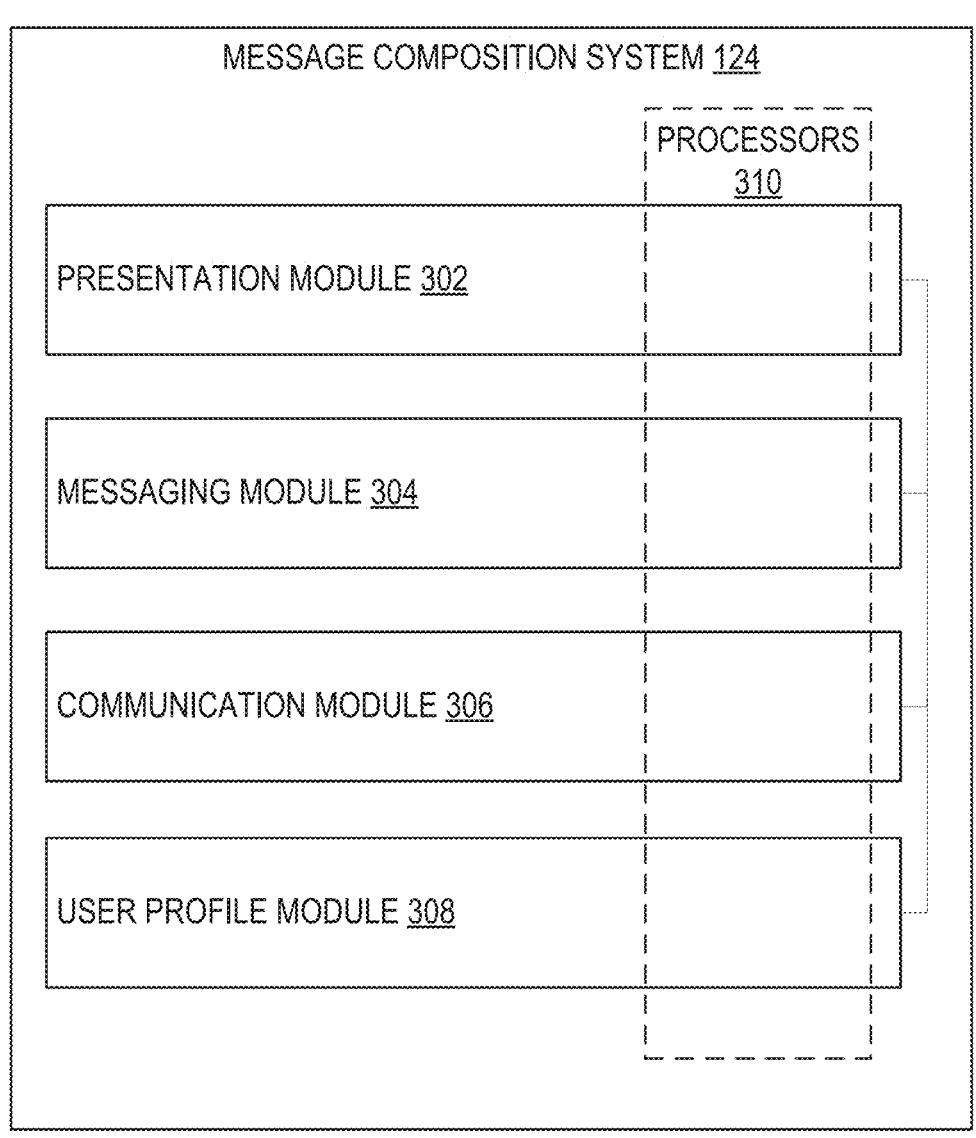
MESSAGE COMPOSITION SYSTEM 124
PROCESSORS
310
PRESENTATION MODULE 302
MESSAGING MODULE 304
COMMUNICATION MODULE 306
USER PROFILE MODULE 308
*FIG. 3*

Figure 4:
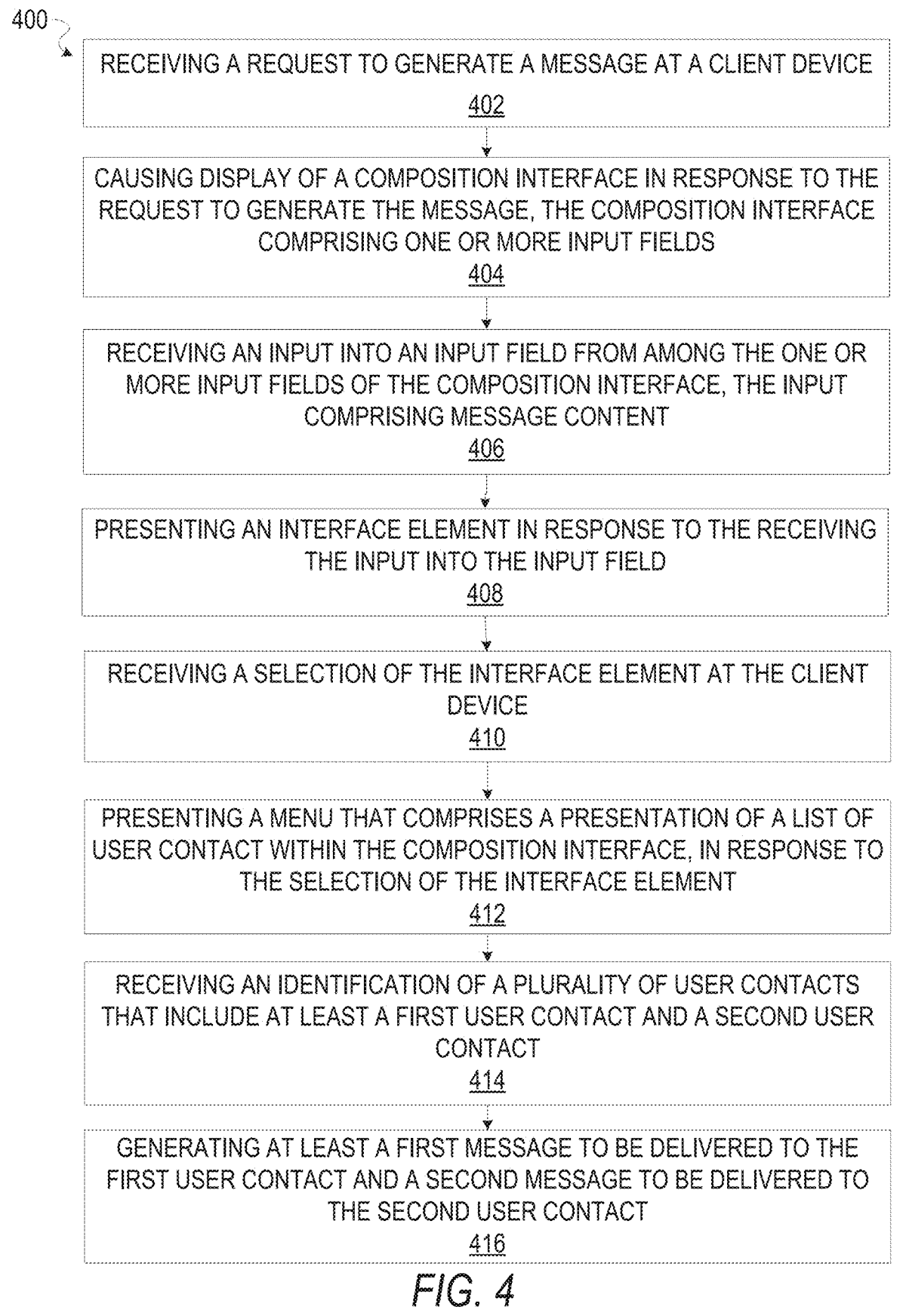

400

RECEIVING A REQUEST TO GENERATE A MESSAGE AT A CLIENT DEVICE
402

CAUSING DISPLAY OF A COMPOSITION INTERFACE IN RESPONSE TO THE REQUEST TO GENERATE THE MESSAGE, THE COMPOSITION INTERFACE COMPRISING ONE OR MORE INPUT FIELDS
404

RECEIVING AN INPUT INTO AN INPUT FIELD FROM AMONG THE ONE OR MORE INPUT FIELDS OF THE COMPOSITION INTERFACE, THE INPUT COMPRISING MESSAGE CONTENT
406

PRESENTING AN INTERFACE ELEMENT IN RESPONSE TO THE RECEIVING THE INPUT INTO THE INPUT FIELD
408

RECEIVING A SELECTION OF THE INTERFACE ELEMENT AT THE CLIENT DEVICE
410

PRESENTING A MENU THAT COMPRISES A PRESENTATION OF A LIST OF USER CONTACT WITHIN THE COMPOSITION INTERFACE, IN RESPONSE TO THE SELECTION OF THE INTERFACE ELEMENT
412

RECEIVING AN IDENTIFICATION OF A PLURALITY OF USER CONTACTS THAT INCLUDE AT LEAST A FIRST USER CONTACT AND A SECOND USER CONTACT
414

GENERATING AT LEAST A FIRST MESSAGE TO BE DELIVERED TO THE FIRST USER CONTACT AND A SECOND MESSAGE TO BE DELIVERED TO THE SECOND USER CONTACT
416

CAUSING DISPLAY OF MESSAGE CONTENT AT THE CLIENT DEVICE
502

RECEIVING AN INPUT THAT SELECTS THE MESSAGE CONTENT
504

CAUSING DISPLAY OF THE COMPOSITION INTERFACE IN RESPONSE TO
THE INPUT THAT SELECTS THE MESSAGE CONTENT
506

MESSAGE COMPOSITION INTERFACE

PRIORITY CLAIM

This application is a continuation of and claims the benefit of priority of U.S. patent application Ser. No. 16/232,803, filed Dec. 26, 2018, which is hereby incorporated by reference in its entirety.

TECHNICAL FIELD

Embodiments of the present disclosure relate generally to mobile computing technology and, more particularly, but not by way of limitation, to systems for composing and distributing a plurality of messages based on a single message request.

BACKGROUND

Social networking sites and services have become increasingly popular. Various social networking sites allow users to distribute messages to one another through instant messaging applications. These instant messaging applications may enable users to conduct messaging communication sessions with users by composing messages and identifying one or more recipients of the message. In some of these applications, a user may choose to either compose a message for a single recipient, or a plurality of recipients (such as a group message).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a block diagram illustrating various modules of a message composition system, according to certain example embodiments.

FIG. 4 is a flowchart depicting a method of generating a plurality of message based on a single message request, according to certain example embodiments.

DETAILED DESCRIPTION

Figure 1:
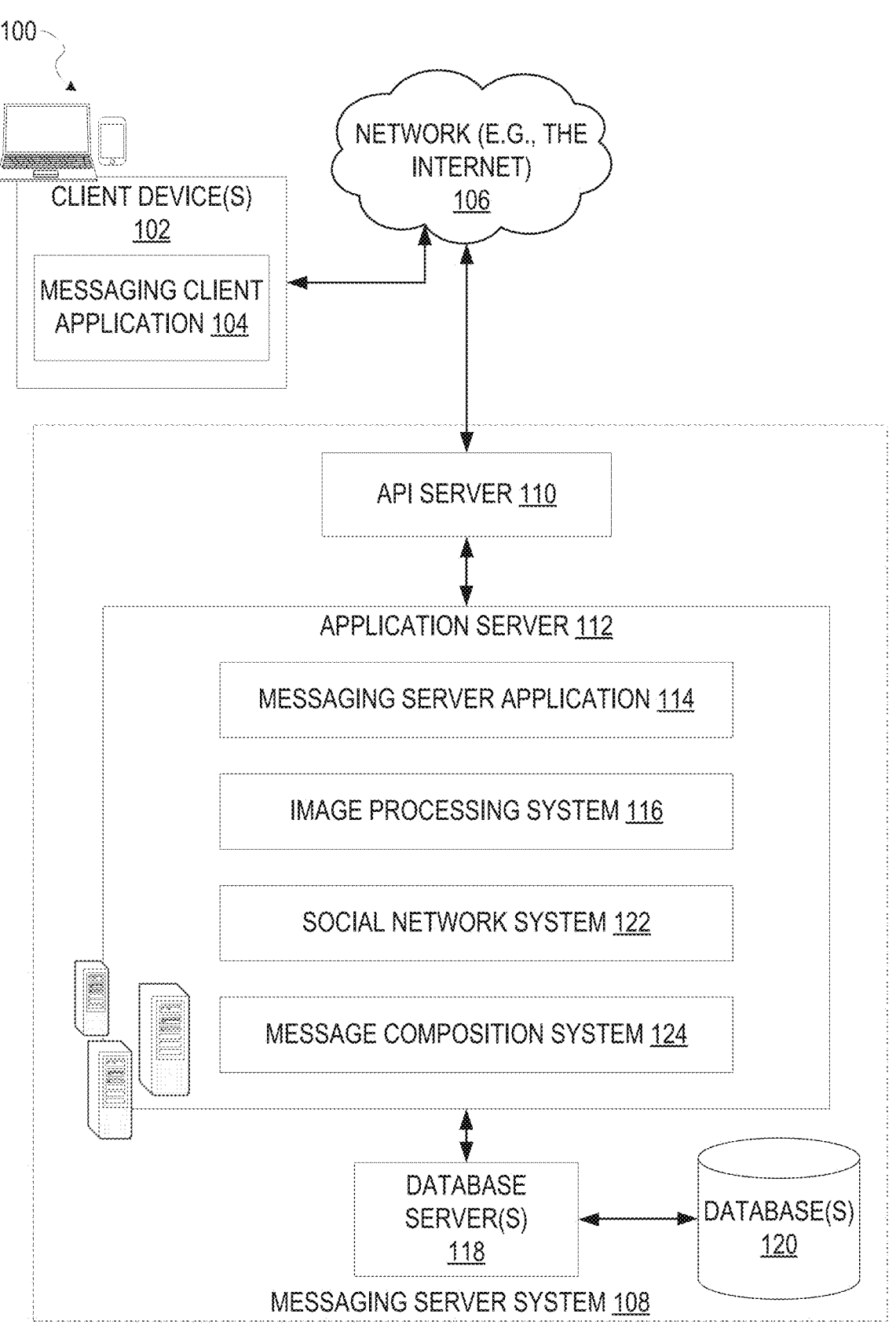
FIG. 1 is a block diagram showing an example messaging system for exchanging data (e.g., messages and associated content) over a network in accordance with some embodiments, wherein the messaging system includes a message composition system.

As discussed above, a messaging applications enable users to generate and distribute messages to one or more users. For example, a user interacting with the messaging application may compose a message and identify one or more recipients of the message. In response, the messaging application will send a single message to either a single or multiple users (such as a group chat). In the scenario where the message is distributed to a single user, responses to the message from the recipient may be displayed in a chat interface, while in the scenario where the message is distributed to a plurality of users, responses from the plurality of users may also be displayed in a group chat interface.

Example embodiments described herein relate to a message composition system to generate and distribute a plurality of messages to individual recipients based on a single message request, wherein each message among the plurality of messages is addressed and sent to a distinct recipient. According to certain embodiments, the message composition system is configured to perform operations that include, receiving a request to generate a message at a client device, causing display of a composition interface in response to the request to generate the message, wherein the composition interface includes a presentation of a menu that includes a list of user contacts, receiving an identification of a plurality of user contacts from among the list of user contacts, and generating a set of messages in response to the identification of the plurality of user contacts, wherein the set of messages are each individually addressed to the users among the plurality of user contacts.

The composition interface includes a display of one or more input fields to receive inputs from a user of a client device. For example, the inputs may include text (e.g., a text string), as well as one or more fields to receive media content such as images, videos, and audio files. In some embodiments, in response to receiving an input into one or more of the input fields, the message composition system activates or otherwise presents an interface element at a position within the composition interface, wherein the interface element is configured to receive inputs. For example, the interface element may include a "send-to" icon which a user of the client device may select.

Responsive to receiving a selection of the interface element, the message composition system activates or otherwise presents a menu within the composition interface, wherein the menu includes a display of a list of user contacts associated with a user of the client device. For example the list of user contacts may be retrieved from a historical message repository associated with the user of the client device (e.g., users which the user of the client device has previously or recently interacted with), as well as social connections of the user within a social network.

In some embodiments, the message composition system may curate and sort subsets of the list of user contacts. For example, the message composition system may identify user contacts that the user of the client device communicates with most frequently from among the list of user contacts, as well as user contacts that the user has recently communicated with. The message composition system may then separate or visually distinguish the identified user contacts from among the list of user contacts.

The user of the client device provides selections to identify one or more user contacts from among the menu displayed within the composition interface. In response to receiving selections of the user contacts, the message composition system applies a graphical icon to the selected user contacts.

Consider an illustrative example from a user perspective. A user of a client device provides an input that includes a request to compose a message. In response to receiving the input, a message composition system generates and causes display of a composition interface at the client device, wherein the composition interface includes a display of one or more input fields to receive message content.

The user of the client device provides an input into an input field among the one or more input fields, and in response, the message composition system activates an interface element at a position within the composition interface. For example, the interface element may include a "send to" icon.

Responsive to the user selecting the interface element, the message composition system presents a menu within the composition interface, wherein the menu comprises a curated display of a list of user contacts, wherein positions of the user contacts among the list of user contacts are based on a message history from a message repository associated with the user. For example, user contacts with which the user communicates with more frequently may be ranked and presented higher among the list of user contacts, while user contacts that the user seldom or rarely communicates with may be ranked lower.

Responsive to receiving selections of user contacts, the message composition system applies a graphical icon to the selected user contacts to visually distinguish the selected contacts from among the list of user contacts. For example, the graphical icon may include a check mark, or similar icon.

Based on the user contacts identified by the user through the menu displayed within the composition interface, the message composition system generates a set of individual messages, wherein each message has a single recipient (rather than a group message). The user may then send a single message that includes the same message content to a plurality of users despite only composing a single message.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a message composition system 124. The message composition system 124 is configured to receive a request to generate a message from a client device 102, cause display of a composition interface at the client device 102 in response to the message request, activate an interface element in response to receiving an input into the composition interface, receive a selection of the interface element, cause display of a menu in response to the selection of the interface element, wherein the menu comprises a display of a user contact list, receive one or more selections of user contacts from among the list of user contacts, and generate a set of messages based on the selections, wherein each message among the set of messages is addressed to a distinct user contact from among the selected user contacts, according to some example embodiments. Further details of the message composition system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the message composition system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the message composition system 124 that configure the message composition system 124 to perform operations to enable a user to compose a single message, receive selections of a plurality of recipients, and generate a set of individual messages to be delivered to each of the plurality of recipients in separate messages, according to some example embodiments.

The message composition system 124 is shown as including a presentation module 302, a messaging module 304, a communication module 306, and a user profile module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the message composition system 124 may physically include an arrangement of one or more of the processors 310 (e.g., a subset of or among the one or more processors of the machine) configured to perform the operations described herein for that module. As another example, any module of the message composition system 124 may include software, hardware, or both, that configure an arrangement of one or more processors 310 (e.g., among the one or more processors of the machine) to perform the operations described herein for that module. Accordingly, different modules of the message composition system 124 may include and configure different arrangements of such processors 310 or a single arrangement of such processors 310 at different points in time. Moreover, any two or more modules of the message composition system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of generating a plurality of messages based on a single message request, according to certain example embodiments. Operations of the method 400 may be performed by the modules described above with respect to FIG. 3. As shown in FIG. 4, the method 400 includes one or more operations 402, 404, 406, 408, 410, 412, 414, and 416.

At operation 402, the messaging module 304 receives a request to generate a message from a client device 102. For example, the presentation module 302 may generate and cause display of an application interface at the client device 102, wherein the application interface comprises one or more user selectable icons corresponding to various user actions that may be performed by an application executed by the client device 102.

In some embodiments a user may provide an input selecting message content presented within the application interface, and in response, the presentation module 302 may cause display of a set of messaging options. For example, a user may provide a user input that includes a "press and hold" input upon media content presented within the application interface. In response to determining that attributes of the user input has transgressed a certain threshold value (e.g., a length of time that the user presses and holds the media content, or a pressure exerted by the user upon the media content), the presentation module 302 generates and presents the set of messaging options within the application interface. The set of messaging options may for example include options to compose a message.

Responsive to the messaging module 304 receiving the request to generate the message, at operation 404 the presentation module 302 generates and causes display of a composition interface at the client device 102. Example composition interface can be seen in FIGS. 6 and 7. According to certain example embodiments, the composition interface comprises a display of one or more input fields to receive user inputs. For example, the input fields may include text fields, or fields to provide inputs identifying, selecting, or generating media content.

At operation 406, the presentation module 302 receives an input into an input field via the client device 102. The input may include media content that comprises a text input, or a selection of media content.

Responsive to receiving the input into the input field presented at the client device 102, the presentation module 302 presents or otherwise activates an interface element at a position within the composition interface. The interface element may include a selectable graphical icon. In some embodiments, the interface element may be displayed in the composition interface in a first display state, and in response to receiving the input into the input field, the presentation module 302 may cause the interface element to be displayed in a second display state. For example, the interface element may include a graphical icon that is first presented in black and white, or grayed-out, indicating to a user that the graphical icon is in a deactivated states, and cannot receive inputs or selection. In response to receiving the input into the input field, the presentation module 302 activates the graphical icon, and updates the display of the graphical icon such that the icon is displayed with color, or with a visual indicator that it is activated and can receive selections or inputs. At operation 410 of the method 400, the user provides an input selecting the activated interface element.

At operation 412, in response to receiving the selection of the interface element from the client device 102, the presentation module 302 generates and causes display of a menu within the composition interface, wherein the menu comprises a presentation of a list of user contacts associated with a user of the client device 102.

In some embodiments, the user profile module 308 may access a message repository (e.g., a database 120) to retrieve one or more user contacts associated with a user of the client device, based on a message history of the user. For example, the user profile module 308 may identify a set of user contacts that the user frequently communicates with, as well as user contacts which the user has most recently communicated with, in order for the presentation module 302 to rank and display the list of user contacts accordingly. In such embodiments, the presentation module 302 may display the list of user contacts within the menu such that a first portion of the list of user contacts correspond with a user's most recent or frequent user contacts, whereas the remainder of the user contacts may be ranked in another fashion (e.g., alphabetically).

At operation 414, the presentation module 302 receives selections of one or more user contacts from among the presentation of the list of user contacts in the menu displayed within the composition interface. For example, a user of the client device 102 may scroll through the list of user contacts and provide inputs identifying one or more user contacts from among the list. In some embodiments, in response to receiving a selection of a user contact from among the list of user contacts, the presentation module 302 applies a graphical icon to the selected user contact to visually distinguish the selected user contacts from among the list of user contacts.

Responsive to receiving the selections of one or more user contacts from among the list of user contacts, the messaging module 304 generates a set of messages, wherein each message among the set of messages is addressed to a user contact from among the selected user contacts. For example, the selected user contacts may include a first user contact and a second user contact, both of which have different correspondence addresses. In response to receiving the selections of the first user contact and the second user contact, the messaging module 304 generates at least a first message addressed to the first user contact as a recipient, and a second messaged addressed to the second user contact as a recipient. The communication module 306 may then distribute the set of messages based on the recipients which the messages are addressed to, such that each user contact receives a separate message from among the set of messages, but where each message comprises the same message content.

Figure 5:
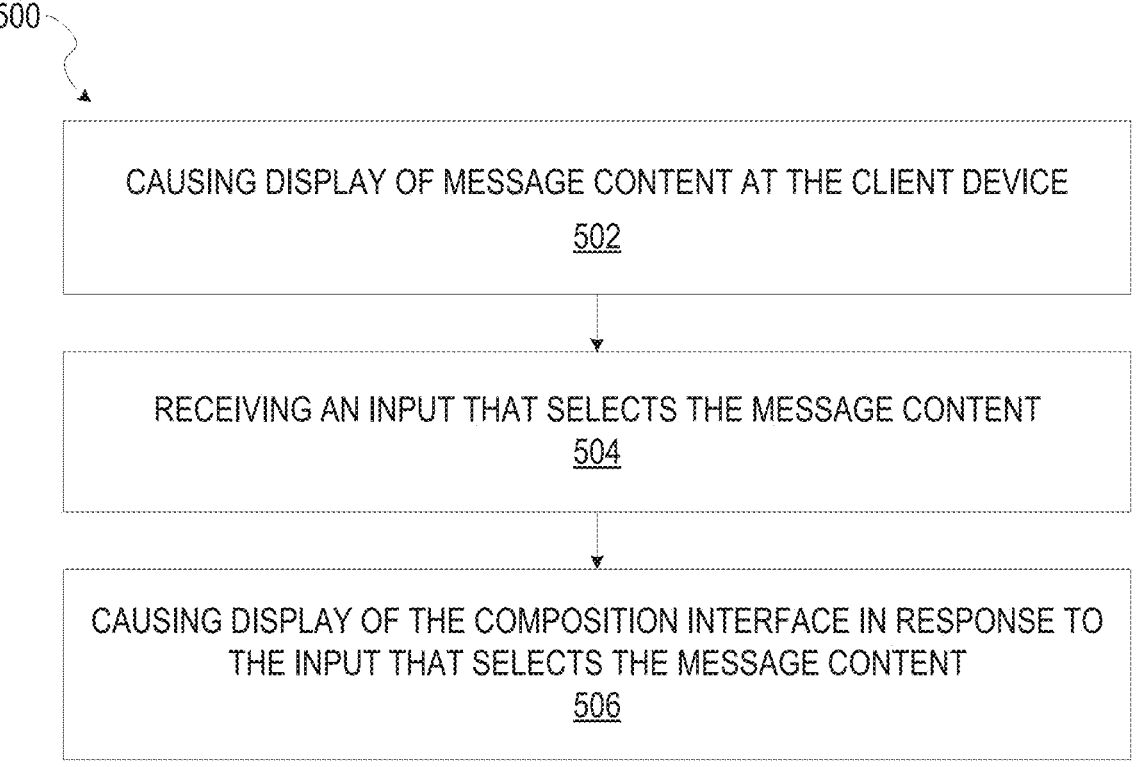
FIG. 5 is a flowchart depicting a method of generating a plurality of message based on a single message request, according to certain example embodiments.

FIG. 5 is a flowchart depicting a method 500 of generating a plurality of message based on a single message request, according to certain example embodiments. Operations of the method 500 may be performed by the modules described above with respect to FIG. 3. As shown in FIG. 5, the method 500 includes one or more operations 502, 504, and 506.

At operation 502, the presentation module 302 causes display of message content at the client device 102. The message content may include media content, such as images, videos, or audio, as well as a text string, or a presentation of a link (e.g., a URL) to content. For example, a user of the client device 102 may themselves receive a message that includes the message content, or may otherwise access the message content through the network 106. The message content may also include media generated by the user at the client device 102.

At operation 504, the presentation module 302 receives an input that selects the message content from the client device 102. For example, a user of the client device 102 may provide an input that selects or otherwise identifies the content. The input may include a tactile input into the client device 102, wherein the client device 102 is a touch enabled device. In such embodiments, the presentation module 302 may detect attributes of the input, such as an input pressure, an input duration, as well as an input type or pattern (e.g., double tap).

Responsive to receiving the input, the presentation module 302 causes display of the composition interface at the client device 102. Examples of the composition interface can be seen in FIGS. 6 and 7.

Figure 6:
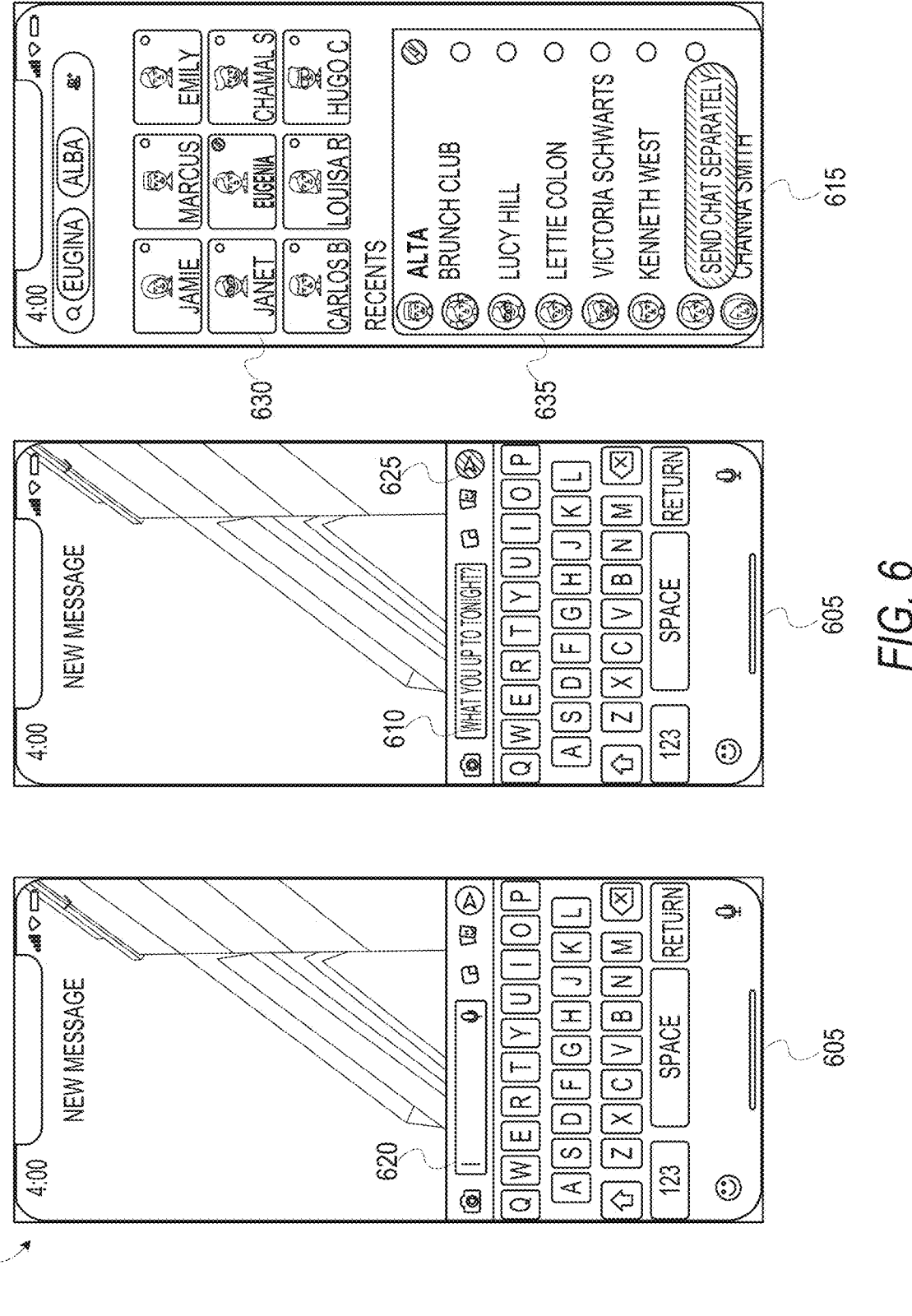
FIG. 6 is an interface flow-diagram depicting interfaces presented by a message composition system, according to certain example embodiments.

FIG. 6 is a flow-diagram 600 depicting interfaces presented by the message composition system 124, according to certain example embodiments. Operations depicted by the interfaces of the flow diagram 600 may be performed by the modules described above with respect to FIG. 3.

As discussed in the method 400 of FIG. 4, the presentation module 302 may generate and cause display of an interface such as the composition interface 605, responsive to receiving a message request. As seen in FIG. 6, the composition interface 605 includes a presentation of one or more input fields, such as the input field 602.

As discussed in operation 406 of the method 400, a user of the client device 102 may provide an input, such as the input 610, and in response, the presentation module 302 may activate an interface element 625. According to such embodiments, the interface element 625 may include a "send to" icon, such that an input selecting the "send to" icon causes the presentation module 302 to display the menu 615 within the composition interface 605, wherein the menu 615 comprises a list of user contacts, such as the list of user contacts 635 and 640.

In some embodiments, the list of user contacts 635 and 640 may be displayed such that recent contacts, or contacts which the user most often communicates with, are displayed in separate positions within the menu 615. For example, the list of user contacts 630 may comprise user contacts which the user of the client device 102 most frequently communicates with, while the list of user contacts 635 comprises user contacts that the user has recently communicated with, such that a sort order of the list of user contacts 635 is based on temporal data.

Figure 7:
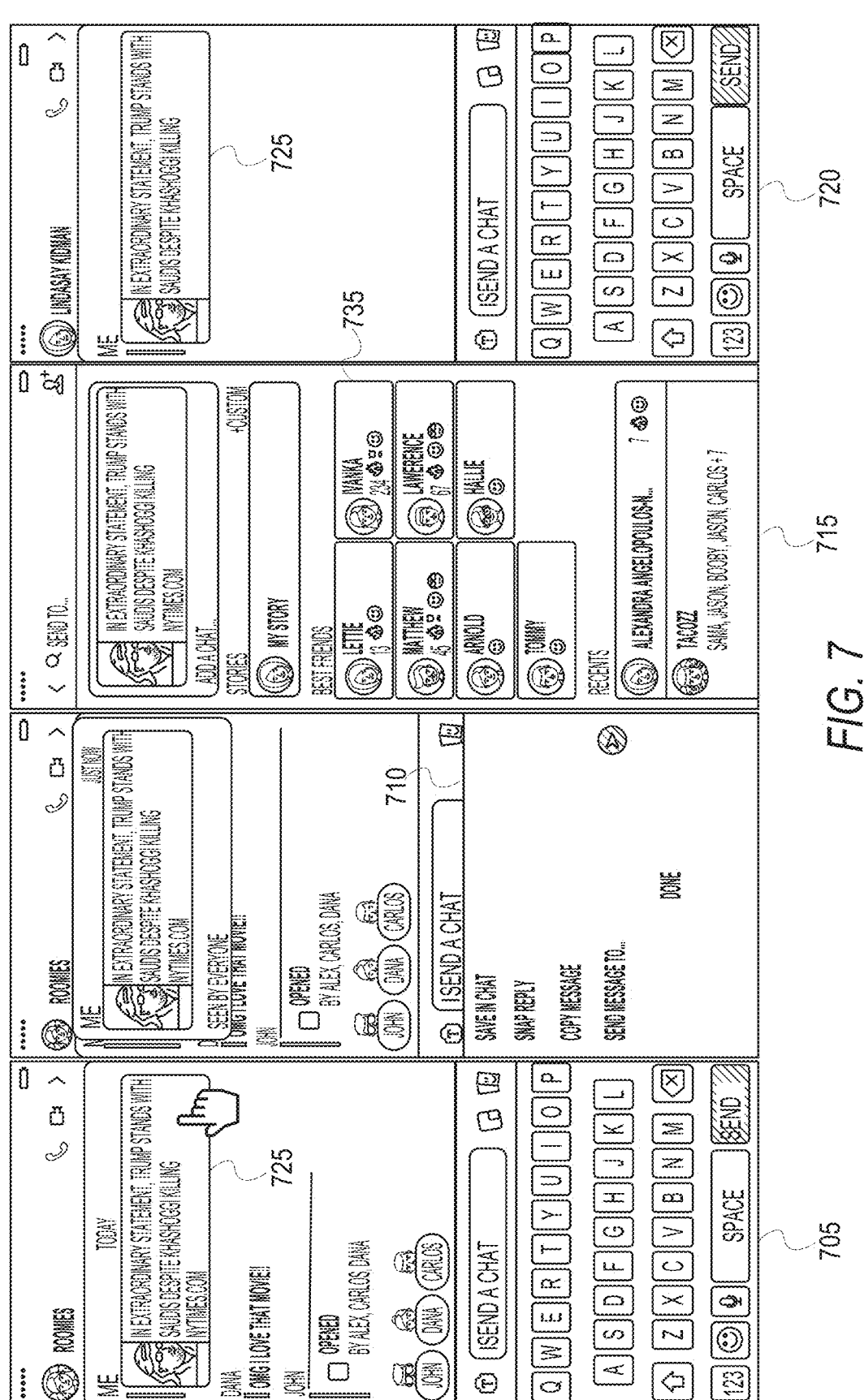
FIG. 7 is an interface flow-diagram depicting interfaces presented by a message composition system, according to certain example embodiments.

FIG. 7 is a flow-diagram 700 depicting interfaces presented by a message composition system, according to certain example embodiments. Operations depicted by the interfaces of the flow-diagram 700 may be performed by the modules described above with respect to FIG. 3.

As seen in interface diagram 705, a user may provide an input to select message content 725. The message content 725 may include media content, as well as a presentation of a link, or a text string. Responsive to receiving an input selecting the message content 725, the message composition system 124 may generate and cause display of one or more messaging options 710, wherein the messaging options 710 include an option to send the message to one or more recipients.

A user of the client device 102 may provide an input selecting an option from among the messaging options 710, and in response, the message composition system 124 generates and causes display of the menu 715, wherein the menu 715 comprises a presentation of a user contacts list 735. The user of the client device 102 may provide inputs to select a plurality of user contacts from among the user contacts list 735. As seen in FIG. 7, the presentation of the user contacts list 735 comprises a display of avatars associated with each user contact.

Based on the selections of user contacts from the user, the message composition 124 generates a set of messages, such as the message 720, to be transmitted to the identified user contacts, wherein each message includes the message content 725.

Software Architecture

Figure 8:
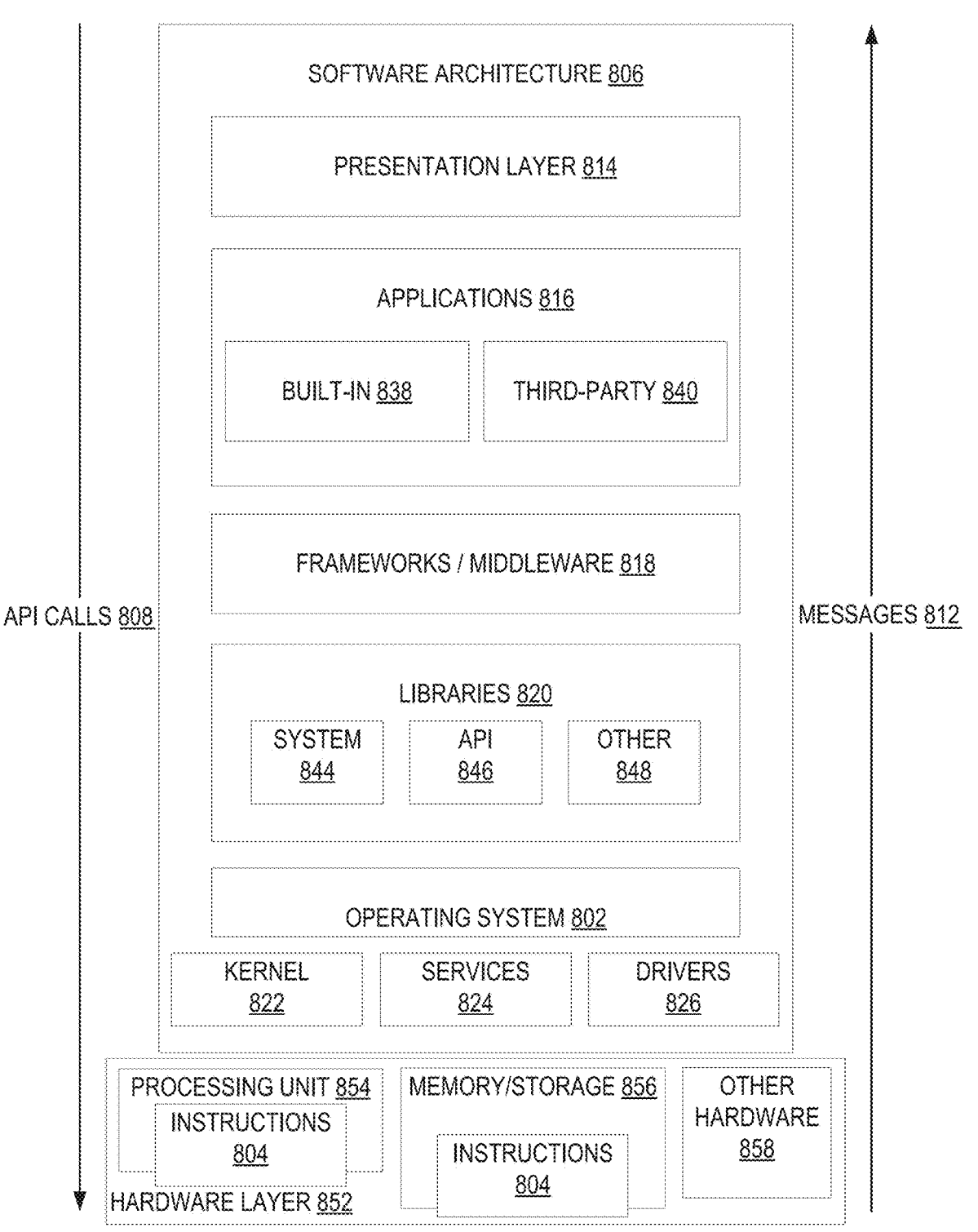
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 800 of FIG. 8. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
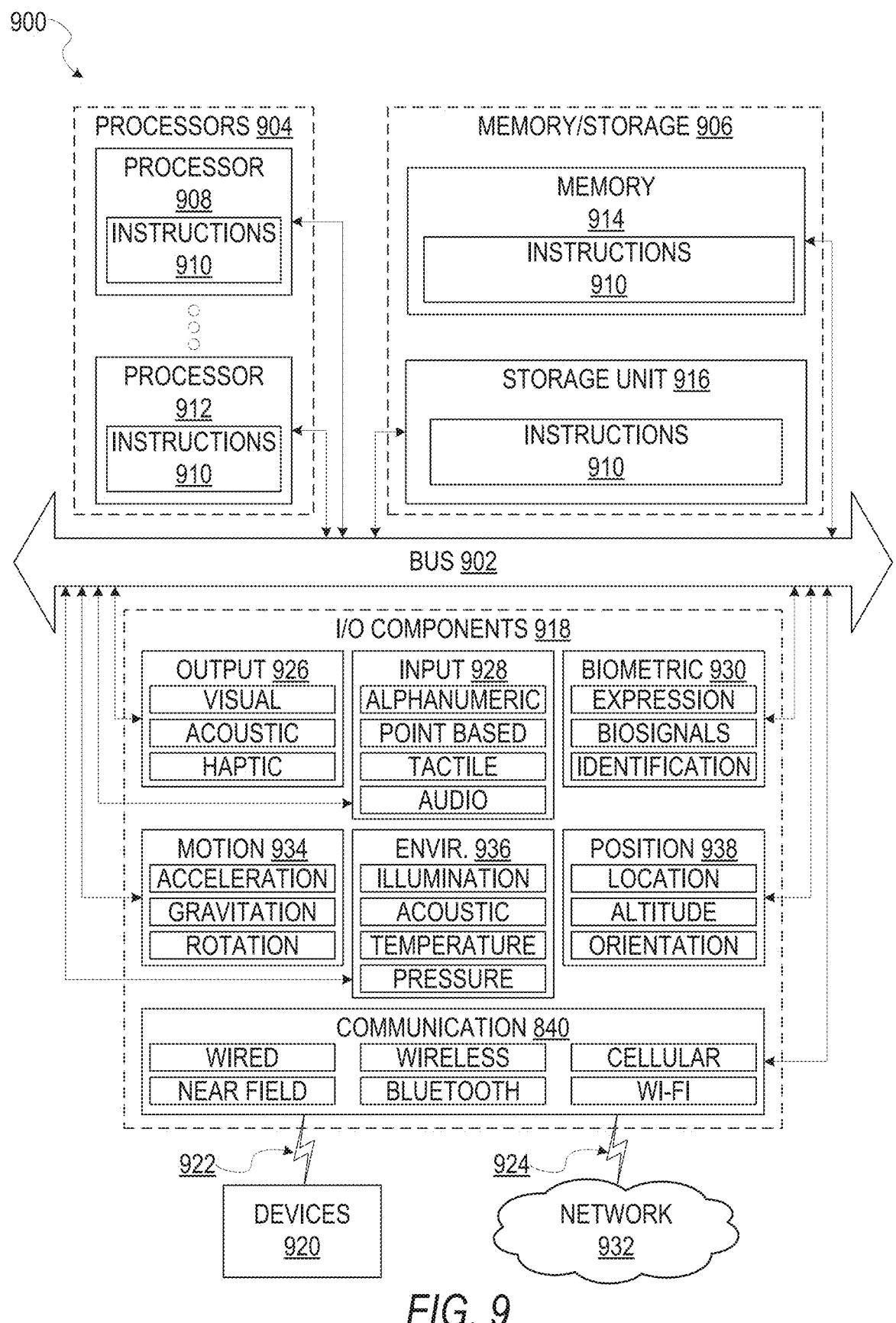
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory

914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another.

One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:

causing display of media content within a graphical user interface (GUI) of a client device associated with a user account associated with a user of the client device;

receiving an input that selects the media content, the input comprising an input attribute;

determining the input attribute transgresses a threshold value;

causing display of a composition interface in response to the input attribute transgressing the threshold value, the composition interface including an interface element;

receiving a selection of the interface element;

identifying a first set of user contacts from among a plurality of user contacts based on a first criteria that includes a communication frequency, and a second set of user contacts from among the plurality of user contacts associated with the user account based on a second criteria that includes a communication history of the user account responsive to the selection of the interface element, the communication history indicating contacts that the user has recently communicated with;

determining a first ranking of the first set of user contacts based on a first ranking criteria that comprises the communication frequency between the user account and the plurality of user contacts, and a second ranking of the second set of user contacts based on a second ranking criteria that comprises the communication history between the user account and the plurality of user contacts; and causing display of a menu element within the GUI that comprises a first portion at a first position within the GUI and a second portion that is displayed concurrently with and separated from the first portion at a second position within the GUI, the first portion including a first presentation of the plurality of user contacts based on the first ranking, and the second portion including a second presentation of the second set of user contacts based on the second ranking.

2. The method of claim 1, wherein the plurality of user contacts is a first set of user contacts identified from among a list of user contacts, and the causing display of the first presentation and the second presentation includes:

causing display of the first set of user contacts within a first menu element; and causing display of a second set of user contacts from among the list of user contacts within a second menu element.

3. The method of claim 1, further comprising:

receiving an identification of a user contact from the menu element; and applying a graphical icon to a display of the user contact within the menu element based on the identification of the user contact.

4. The method of claim 1, further comprising:

receiving an identification of a plurality of user contacts from the menu element; and generating a plurality of messages, each message among the plurality of messages addressed to a single user from among the plurality of user contacts.

5. A system comprising:

a memory; and at least one hardware processor coupled to the memory and comprising instructions that causes the system to perform operations comprising:

causing display of media content within a graphical user interface (GUI) of a client device associated with a user account associated with a user of the client device;

receiving an input that selects the media content, the input comprising an input attribute;

determining the input attribute transgresses a threshold value;

causing display of a composition interface in response to the input attribute transgressing the threshold value, the composition interface including an interface element;

receiving a selection of the interface element;

identifying a first set of user contacts from among a plurality of user contacts based on a first criteria that includes a communication frequency, and a second set of user contacts from among the plurality of user contacts associated with the user account based on a second criteria that includes a communication history of the user account responsive to the selection of the interface element, the communication history indicating contacts that the user has recently communicated with;

determining a first ranking of the first set of user contacts based on a first ranking criteria that comprises the communication frequency between the user account and the plurality of user contacts, and a second ranking of the second set of user contacts based on a second ranking criteria that comprises the communication history between the user account and the plurality of user contacts; and causing display of a menu element within the GUI that comprises a first portion at a first position within the GUI and a second portion that is displayed concurrently with and separated from the first portion at a second position within the GUI, the first portion including a first presentation of the plurality of user contacts based on the first ranking, and the second portion including a second presentation of the second set of user contacts based on the second ranking.

6. The system of claim 5, wherein the plurality of user contacts is a first set of user contacts identified from among a list of user contacts, and the causing display of the first presentation and the second presentation includes:

causing display of the first set of user contacts within a first menu element; and causing display of a second set of user contacts from among the list of user contacts within a second menu element.

7. The system of claim 5, further comprising:

receiving an identification of a user contact from the menu element; and applying a graphical icon to a display of the user contact within the menu element based on the identification of the user contact.

8. The system of claim 5, further comprising:

receiving an identification of a plurality of user contacts from the menu element; and generating a plurality of messages, each message among the plurality of messages addressed to a single user from among the plurality of user contacts.

9. A non-transitory machine-readable storage medium comprising instructions that, when executed by one or more processors of a machine, cause the machine to perform operations comprising:

causing display of media content within a graphical user interface (GUI) of a client device associated with a user account associated with a user of the client device;

receiving an input that selects the media content, the input comprising an input attribute;

determining the input attribute transgresses a threshold value;

causing display of a composition interface in response to the input attribute transgressing the threshold value, the composition interface including an interface element;

receiving a selection of the interface element;

identifying a first set of user contacts from among a plurality of user contacts based on a first criteria that includes a communication frequency, and a second set of user contacts from among the plurality of user contacts associated with the user account based on a second criteria that includes a communication history of the user account responsive to the selection of the interface element, the communication history indicating contacts that the user has recently communicated with;

determining a first ranking of the first set of user contacts based on a first ranking criteria that comprises the communication frequency between the user account and the plurality of user contacts, and a second ranking of the second set of user contacts based on a second ranking criteria that comprises the communication history between the user account and the plurality of user contacts; and causing display of a menu element within the GUI that comprises a first portion at a first position within the GUI and a second portion that is displayed concurrently with and separated from the first portion at a second position within the GUI, the first portion including a first presentation of the plurality of user contacts based on the first ranking, and the second portion including a second presentation of the second set of user contacts based on the second ranking.

10. The non-transitory machine-readable storage medium of claim 9, wherein the plurality of user contacts is a first set of user contacts identified from among a list of user contacts, and the causing display of the menu element that includes the first presentation of the first set of user contacts and the second presentation of the second set of user contacts includes:

causing display of the first set of user contacts within a first menu element; and causing display of a second set of user contacts from among the list of user contacts within a second menu element.

11. The non-transitory machine-readable storage medium of claim 9, further comprising:

receiving an identification of a user contact from the menu element; and applying a graphical icon to a display of the user contact among the menu element based on the identification of the user contact.

12. The non-transitory machine-readable storage medium of claim 9, further comprising:

receiving an identification of a plurality of user contacts from the menu element; and generating a plurality of messages, each message among the plurality of messages addressed to a single user from among the plurality of user contacts.

\* \* \* \* \*